No. 849,083. PATENTED APR. 2, 1907.
J. P. PERKINS.
FLUID AGITATOR.
APPLICATION FILED MAR. 15, 1906.
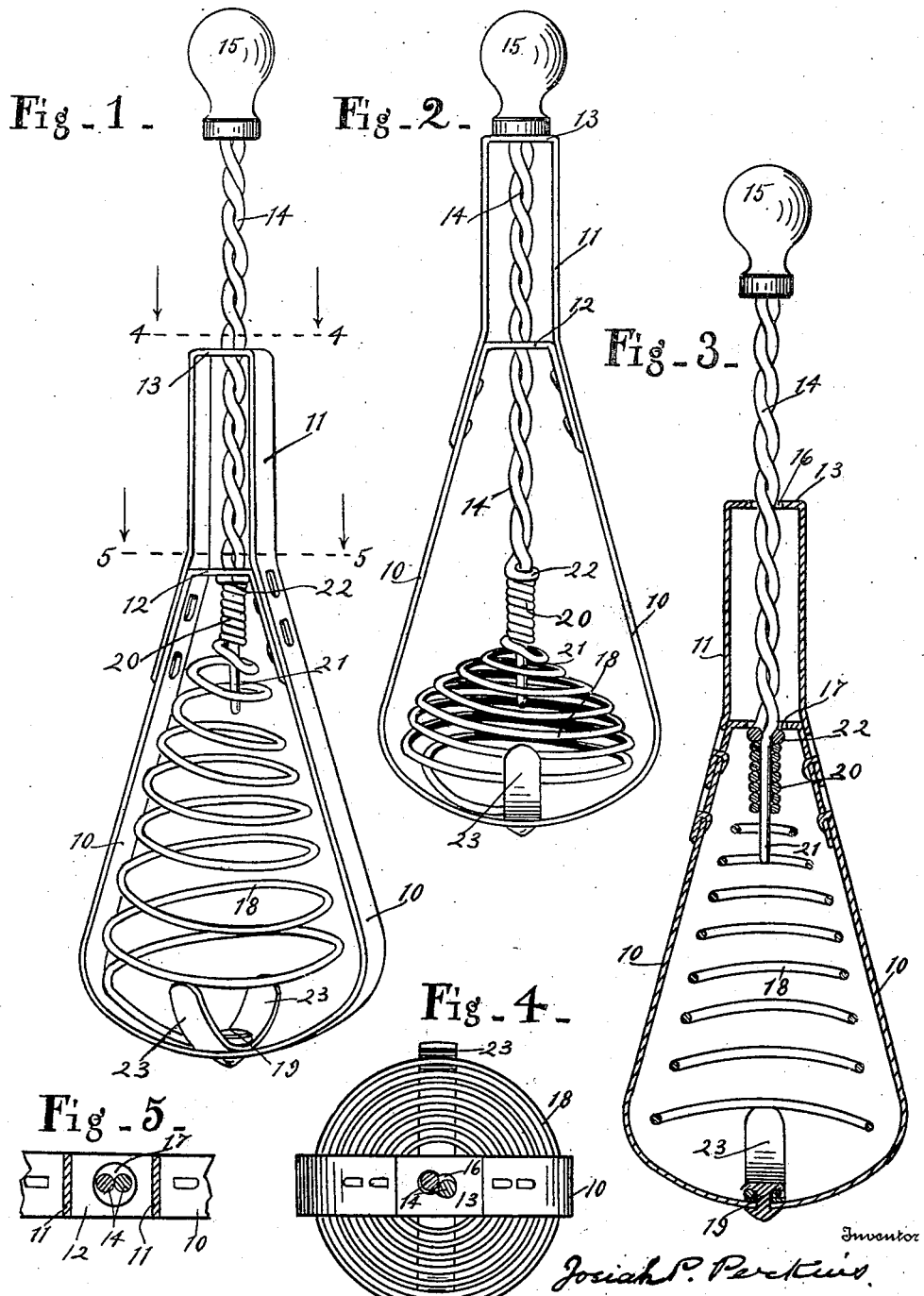

UNITED STATES PATENT OFFICE.

JOSIAH P. PERKINS, OF INDIANAPOLIS, INDIANA.

FLUID-AGITATOR.

No. 849,083.      Specification of Letters Patent.      Patented April 2, 1907.

Application filed March 15, 1906. Serial No. 306,169.

*To all whom it may concern:*

Be it known that I, JOSIAH P. PERKINS, of Indianapolis, county of Marion, and State of Indiana, have invented a certain new and useful Fluid-Agitator; and I do hereby declare that the following is a full, clear, and exact description thereof, reference being had to the accompanying drawings, in which like letters refer to like parts.

The object of this invention is to provide an improved device for beating eggs or whipping cream and the like. The chief feature consists in the vertically-movable beater and whipper and in the combination of such vertically-movable beater and whipper with a revolving beater and whipper, both revolving together and the former moving vertically within the latter. The movements of the two beaters or whippers are simultaneous.

The vertically-movable whipper or beater is in the form of a collapsible helical spring that extends upward and is collapsible downward, and said spring has the additional function of returning the stem which actuates both sorts of beater or whipper.

The foregoing, together with other features of invention herein, will fully appear from the accompanying drawings and the following description and claims.

In the drawings, Figure 1 is a side elevation of the device in its normal unoperating condition. Fig. 2 is an elevation thereof in the operating position. Fig. 3 is a central vertical section through the device as shown in Fig. 1. Fig. 4 is a section on line 4 4 of Fig. 1. Fig. 5 is a section on the line 5 5 of Fig. 1.

There is shown in the drawings herein a revolving beater or whipper 10, the lower part of which is substantially pear-shaped, and the upper part or head consists of two parallel bars 11, with a bottom cross-plate 12 and a top cross-plate 13 between them. The bottom cross-plate is at the upper end of the pear-shaped lower end of the revolving beater This revolving beater, including both the lower and upper portions, is preferably formed of one strip of metal, as shown. Said revolving beater or whipper is actuated by the stem 14, which is formed of two twisted wires preferably, although it could be made solid, so long as its form is in the nature of a screw with an extremely coarse pitch. The stem has on its upper end a handle 15. Said stem operates vertically through an elongated slot 16 in the top cross-plate 13 of the head of the revolving beater, and the lower part of said stem extends loosely through a hole 17 in the bottom cross-plate 12, that guides the stem in its vertical movement, and such vertical movement by reason of the slot 16 causes the revolution of the beater 10. The actuating-stem 14 is moved downward by hand, and the return upward movement is effected by the vertically-moving beater or whipper 18. This beater 18 is formed of a helical spring with its lower end secured at 19 to the lower part of the revolving beater and with its lower portion of greater diameter, preferably, than its upper end, and said spring at its upper end is formed of a rather tight coil 20, that extends loosely about a straight downward-extending pin 21 from the lower end of the actuating-stem 14, that permits the coil 20 to turn on the pin 21 freely. A stop 22 is formed at the lower end of the stem 14 and below the bottom cross-plate 12. This stop has three functions: First, by engaging the bottom cross-plate 12 it stops the upward movement; secondly, it furnishes a bearing against which the coil 20 of the vertical beater bears, and, thirdly, it gives to the vertical beater its downward movement or presses it downward as the stem is forced downward. The lower part of the handle 15 by engaging top plate 13 stops the downward movement of the stem 14. I also secure to the lower end of the revolving beater an auxiliary beater 23, having an arm or portion extending laterally on each side of the lower part of the revolving beater and upon the outside of the lower portion of the vertically-moving beater. At the bottom of the device there is a bearing consisting, preferably, of the rivet 19, on which the whole device rests during operation.

From the foregoing it will be understood that the vertically-moving beater 18 does not vertically move bodily, but merely collapses, the upper coils of the spring having a relatively greater extent of movement than the lower ones; but said beater revolves as a whole, so that said beater 18 has two movements, the vertical and the revolving, going on simultaneously, and at the same time there is the additional purely revolving movement of the beater 10. The spring forming said vertical beater not only acts as a beater, but forces the stem upward in its upward movement.

What I claim as my invention, and desire to secure by Letters Patent, is—

1. A fluid-agitator including a beating element, means for vertically reciprocating the same, and means actuated by said vertically-reciprocating means for causing the simultaneous horizontal revolution of said beating element.

2. A fluid-agitator including two beaters, one within the other, said outer beater being revoluble and the inner beater being vertically movable, and a single means for actuating both beaters.

3. A fluid-agitator including a helical spring, revoluble means on which said spring is mounted and to which said spring is secured at its lower end, and a vertically-movable actuator that revolves said revolving means and compresses said spring.

4. A fluid-agitator including a revoluble beater, an actuator operating through the upper part of said revoluble beater for revolving it, and a helical spring within the lower part of said revoluble beater that is secured at its lower end to said revoluble beater and presses upward against said actuator.

5. A fluid-agitator including a revoluble beater with a head provided with top and bottom cross-plates, the bottom plate having a guiding-hole in it and the top plate having an elongated slot in it, a twisted stem vertically movable through both of said plates, a stop at its lower end, a stop at its upper end, and a spring for upwardly actuating said stem.

6. A fluid-agitator including a revoluble beater with a head provided with top and bottom cross-plates, the bottom plate having a guiding-hole in it and the top plate having an elongated slot in it, a twisted stem vertically movable through both of said plates, a stop at its lower end, a stop at its upper end, an upwardly-acting spring secured to the lower part of said revolving beater and pressing upwardly against the lower part of said stem, and a pin extending downward from the lower end of the stem on which the upper end of said spring has bearing.

7. A fluid-agitator including a revoluble beater with a head provided with top and bottom cross-plates, the bottom plate having a guiding-hole in it and the top plate having an elongated slot in it, a twisted stem vertically movable through both of said plates, a stop at its lower end, a stop at its upper end, a spring for upwardly actuating said stem, and an auxiliary beater secured to the lower end of the revolving beater transversely thereof with its ends extending upward.

8. A fluid-agitator including a revoluble beater with a head provided with top and bottom cross-plates, the bottom plate having a guiding-hole in it and the top plate having an elongated slot in it, a twisted stem vertically movable through both of said plates, a pin at the lower end of said stem, a stop at its lower end, a stop at its upper end, a helical spring within the lower part of said revolving beater, the lower part of said spring being secured to said revolving beater and the upper part being coiled loosely about said pin, and an auxiliary beater secured to the lower end of the revolving beater transversely thereof with its ends extending upwardly beside the lower portion of said spring.

In witness whereof I have hereunto affixed my signature in the presence of the witnesses herein named.

JOSIAH P. PERKINS.

Witnesses:
NELLIE ALLEMONG,
HELEN B. McCORD.